(12) United States Patent
Chen et al.

(10) Patent No.: US 11,704,016 B2
(45) Date of Patent: Jul. 18, 2023

(54) TECHNIQUES FOR INTERACTING WITH HANDHELD DEVICES (71) Applicant: AUTODESK, INC., San Francisco, CA (US)

(72) Inventors: Xiang Anthony Chen, Pittsburgh, PA (US); Tovi Grossman, Toronto (CA); Daniel Wigdor, Toronto (CA); George Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 267 days.

(21) Appl. No.: 14/560,398

(22) Filed: Dec. 4, 2014

(65) Prior Publication Data

US 2015/0153928 A1 Jun. 4, 2015

Related U.S. Application Data (60) Provisional application No. 61/911,954, filed on Dec. 4, 2013.

(51) Int. Cl.
G06F 3/04883 (2022.01)
G06F 3/0346 (2013.01)
G06F 3/04886 (2022.01)
G06F 1/16 (2006.01)

(52) U.S. Cl.
CPC .......... *G06F 3/04886* (2013.01); *G06F 1/163* (2013.01); *G06F 1/1626* (2013.01); *G06F 1/1694* (2013.01); *G06F 3/0346* (2013.01); *G06F 3/04883* (2013.01); *G06F 2203/0381* (2013.01); *G06F 2203/0382* (2013.01); *G06F 2203/04808* (2013.01)

(58) Field of Classification Search
CPC ...... G06F 3/017; G06F 3/0481; G06F 3/1423; G06F 3/04886; G06F 1/1626; G06F 1/163; G06F 1/1694; G06F 3/0346; G06F 3/04883; G06F 2203/0381; G06F 2203/0382; G06F 2203/04808; G09G 2340/145; H04L 41/26
See application file for complete search history.

(56) References Cited

U.S. PATENT DOCUMENTS

| | | | | |
|---|---|---|---|---|
| 7,877,707 B2 * | 1/2011 | Westerman | ......... | G06F 3/04883 715/863 |
| 8,376,854 B2 * | 2/2013 | Ketabdar | ................ | A63F 13/06 345/156 |

(Continued)

OTHER PUBLICATIONS

Amento, et al., "The Sound of One Hand: A Wrist-mounted Bio-acoustic Fingertip Gesture Interface", CHI '02, pp. 724-725.

(Continued)

*Primary Examiner* — Jennifer N Welch
*Assistant Examiner* — Kc Chen
(74) *Attorney, Agent, or Firm* — Artegis Law Group, LLP (57) ABSTRACT

In one embodiment of the present invention, a method for multiple device interaction includes detecting an orientation of a first device relative to a second device. The method also includes detecting a first gesture performed with either the first device or the second device, wherein the first gesture causes a first action that is based at least in part on the orientation of the first device relative to the second device.

20 Claims, 5 Drawing Sheets

(56) References Cited

U.S. PATENT DOCUMENTS

| | | | | |
|---|---|---|---|---|
| 8,379,488 | B1* | 2/2013 | Gossweiler, III | H04M 1/72552 368/10 |
| 8,854,925 | B1* | 10/2014 | Lee | G04G 9/0005 368/10 |
| 9,013,452 | B2* | 4/2015 | Harrison | G06F 3/04842 345/177 |
| 2005/0093868 | A1* | 5/2005 | Hinckley | G06F 3/011 345/502 |
| 2005/0264540 | A1* | 12/2005 | Niwa | G06F 1/1616 345/173 |
| 2006/0146765 | A1* | 7/2006 | Van De Sluis | G06F 3/016 370/338 |
| 2007/0124503 | A1* | 5/2007 | Ramos | G06F 3/017 709/248 |
| 2010/0066643 | A1* | 3/2010 | King | G06F 1/1616 345/1.3 |
| 2011/0007035 | A1* | 1/2011 | Shai | G06F 3/0338 345/179 |
| 2011/0074695 | A1* | 3/2011 | Rapp | G06F 3/04845 345/173 |
| 2011/0143769 | A1* | 6/2011 | Jones | G06F 1/1624 455/456.1 |
| 2011/0163944 | A1* | 7/2011 | Bilbrey | G01D 21/02 345/156 |
| 2011/0209104 | A1* | 8/2011 | Hinckley | G06F 3/0416 715/863 |
| 2011/0210931 | A1* | 9/2011 | Shai | G06F 3/04883 345/173 |
| 2011/0261058 | A1* | 10/2011 | Luo | G06F 1/1626 345/441 |
| 2012/0081322 | A1* | 4/2012 | Sirpal | G06F 1/1616 345/173 |
| 2012/0110497 | A1* | 5/2012 | Gimpl | G06F 1/1616 715/778 |
| 2013/0169550 | A1* | 7/2013 | Gai | G06F 3/041 345/173 |
| 2013/0281164 | A1* | 10/2013 | Alameh | H04M 1/05 455/566 |
| 2014/0136986 | A1* | 5/2014 | Martin | G06F 3/0488 715/748 |
| 2014/0139454 | A1* | 5/2014 | Mistry | G06F 3/041 345/173 |
| 2014/0143678 | A1* | 5/2014 | Mistry | G06F 3/017 715/746 |
| 2014/0292720 | A1* | 10/2014 | Liang | H04L 67/06 345/174 |
| 2015/0022438 | A1* | 1/2015 | Hong | H04M 1/7253 345/156 |
| 2015/0062086 | A1* | 3/2015 | Nattukallingal | G06F 3/017 345/175 |
| 2015/0261373 | A1* | 9/2015 | Smus | G06F 3/04883 345/174 |
| 2015/0334519 | A1* | 11/2015 | Gai | G06F 3/041 455/41.2 |
| 2016/0005150 | A1* | 1/2016 | Ghassabian | G06F 3/0488 345/654 |
| 2016/0188181 | A1* | 6/2016 | Smith | G06F 3/048 715/765 |

OTHER PUBLICATIONS

Ballagas, et al., "The Smart Phone: A Ubiquitous Input Device", IEEE Pervasive Computing, vol. 5, Issue 1, Jan. 2006, pp. 70-77.
Baudisch, et al., "Back-of-device interaction allows creating very small touch devices", CHI '09, 1923-1932.
Butler, et al., "SideSight", UIST '08, pp. 201-204.
Buxton, "Integrating the Periphery and Context: A New Taxonomy of Telematics", Proceedings of Graphics Interface '95, 1995, pp. 239-246.
Buxton, "Chunking and Phrasing and the Design of Human-Computer Dialogues", IFIP '86, pp. 494-499.
Chen, et al., "A Survey of Context-Aware Mobile Computing Research", Technical Report TR2000-381, Dept. of Computer Science, Dartmouth College, 2000.
Chen, et al., "Duet: Exploring Joint Interactions on a Smart Phone and a Smart Watch", Session: Watches and Small Devices, CHI 2014, pp. 159-168.
Crossan, et al., "Wrist rotation for interaction in mobile contexts", MobileHCI '08, pp. 435-438.
Falk, "The conversational duet", Proceedings of the Annual Meeting of the Berkeley Linguistics Society, 2011.
Fitzmaurice, "Situated information spaces and spatially aware palmtop computers", CACM 36, 7, 1993, pp. 39-49.
Harrison, et al., "Abracadabra: Wireless, High-Precision, and Unpowered Finger Input for Very Small Mobile Devices", UIST '09, Oct. 4-7, 2009, pp. 121-124.
Harrison, et al., "TapSense: Enhancing Finger Interaction on Touch Surfaces", UIST'11, Oct. 16-19, 2011, pp. 627-634.
Hinckley, et al., "Foreground and background interaction with sensor-enhanced mobile devices", TOCHI '12, 1, 2005, pp. 31-52.
Hinckley, et al., "Sensing Techniques for Mobile Interaction", CHI '00, pp. 91-100.
Hinckley, et al., "Stitching: Pen Gestures that Span Multiple Displays", AVI '04, May 25-28, 2004, pp. 23-30.
Hinckley, et al., "Synchronous Gestures for Multiple Persons and Computers", UIST '03, pp. 149-158.
Holmquist, et al., "Smart-Its Friends: A Technique for Users to Easily Establish Connections between Smart Artefacts", Ubicomp 2001, pp. 116-122.
Hudson, et al., "Whack Gestures: Inexact and Inattentive Interaction with Mobile Devices", TEI 2010, pp. 109-103.
Ishiguro, et al., "Aided Eyes: Eye Activity Sensing for Daily Life", Augmented Human Conference Apr. 2-3, 2010, pp. 1-7.
Kim, et al., "Digits: Freehand 3D Interactions Anywhere Using a Wrist-Worn Gloveless Sensor", UIST '12, Oct. 7-10, 2012, pp. 167-176.
Kim, et al., "The Gesture Watch: A Wireless Contact-free Gesture based Wrist Interface", ISWC '07, pp. 1-8.
Kortuem, et al., "Sensing and Visualizing Spatial Relations of Mobile Devices", UIST Jan. 2005, 10 pages.
Lyons, et al., "Facet: a multi-segment wrist worn system", UIST '12 Proceedings of the 25th annual ACM symposium on User interface software and technology, Oct. 7-10, 2012, pp. 123-130.
Mann, "Smart Clothing: The Shift to Wearable Computing", Communications of the ACM, vol. 39 Issue 8, Aug. 1996, pp. 23-24.
Marquardt, et al., "Gradual Engagement: Facilitating Information Exchange between Digital Devices as a Function of Proximity ", ITS '12, Nov. 11-14, 2012, pp. 31-40.
Maurer, et al., "eWatch: A Wearable Sensor and Notification Platform", BSN'06, pp. 142-145.
McCallum, et al., "ARC-Pad: Absolute+Relative Cursor Positioning for Large Displays with a Mobile Touchscreen", UIST '09, Oct. 4-7, 2009, p. 153.
Merrill, et al., "Siftables: Towards Sensor Network User Interfaces", TEI '07, pp. 75-78.
Ni, et al., "Disappearing Mobile Devices", UIST '09, Oct. 4-7, 2009, pp. 101-110.
Oney, et al., "ZoomBoard: A Diminutive QWERTY Soft Keyboard Using Iterative Zooming for Ultra-Small Devices", CHI '13, Apr. 27-May 2, 2013, pp. 2799-2803.
Post, et al., Smart Fabric, or "Wearable Clothing", ISWC '97, 1997, pp. 167-168.
Rahman, et al., "Tilt Techniques: Investigating the Dexterity of Wrist-based Input", CHI '09, Apr. 4-9, 2009, pp. 1943-1952.
Rekimoto, "Tilting Operations for Small Screen Interfaces", UIST '96, pp. 167-168.
Rekimoto, "Pick-and-Drop: A [direct Manipulation Technique for Multiple Computer Environments", UIST '97, pp. 31-39.
Rekimoto, "GestureWrist and GesturePad: UnobtrusiveWearable Interaction Devices", ISWC '01, pp. 21-27.
Ruiz, et al., "DoubleFlip: A Motion Gesture Delimiter for Mobile Interaction", CHI '11, pp. 2717-2720.

(56) References Cited

OTHER PUBLICATIONS

Schmidt, et al., "A Cross-Device Interaction Style for Mobiles and Surfaces", DIS '12, Jun. 11-15, 2012, pp. 318-327.
Siek, et al., "Fat Finger Worries: How Older and Younger Users Physically Interact with PDAs", Interact '05, pp. 267-280.
Streitz, et al., "Roomware for Cooperative Buildings: Integrated Design of Architectural Spaces and Information Spaces", Cooperative Buildings: Integrating Information, Organization, and Architecture, Feb. 25-26, 1998, pp. 4-21.
Strohmeier, et al., "With a Flick of the Wrist: Stretch Sensors as Lightweight Input for Mobile Devices", TEI '12, pp. 307-308.
Vogel, et al., "Shift: A Technique for Operating Pen-Based Interfaces Using Touch", CHI '07, Apr. 28-May 3, 2007, pp. 657-666.
Wigdor, et al., "LucidTouch: A See-Through Mobile Device", UIST '07, Oct. 7-10, 2007, pp. 269-278. Yee, "Peephole Displays: Pen Interaction on Spatially Aware Handheld Computers", CHI '03, Apr. 5-10, 2003, pp. 1-9.
Yee, "Peephole Displays: Pen Interaction on Spatially Aware Handheld Computers", CHI '03, Apr. 5-10, 2003, pp. 1-9.

* cited by examiner

FIG. 1

|  | Watch Foreground | Watch Background |
|---|---|---|
| Phone Foreground | Duet:<br>• Phone as a primary input and output platform;<br>• Watch as an input device or extended display. | Duet:<br>• Phone as a primary input and output platform;<br>• Watch as a sensor. |
| Phone Background | Current commercial designs:<br>• Phone as an inactivated information portal;<br>• Watch as a viewport or remote control. | Prior research:<br>• Both phone and watch used for context and activity sensing. |

WATCH FOREGROUND, PHONE FOREGROUND

WATCH BACKGROUND, PHONE FOREGROUND

FIG. 4

|  | Double bump | Flip and tap | Hold and flip | Handedness recognition | Finger posture recognition |
|---|---|---|---|---|---|
| 10-fold cross val. | 93.87% | 97.90% | 97.56% | 99.06% | 99.34% |
| Per user classifiers | 92.10% (5.34%) | 95.92% (2.89%) | 90.11% (11.24%) | 97.33% (1.92%) | 97.95% (0.80%) |
| General classifiers | 88.33% 9.89% | 94.38% (9.91%) | 85.29% (10.90%) | 98.23% (2.64%) | 93.33% (9.07%) |

FIG. 5

| Pinch to open | Pinch to close | Phone to watch | Watch to phone |
|---|---|---|---|
| 97.69% (5.67%) | 98.61% (2.32%) | 95.83% (3.83%) | 96.76% (3.25%) |

TECHNIQUES FOR INTERACTING WITH HANDHELD DEVICES

CROSS-REFERENCE TO RELATED APPLICATIONS

This application claims benefit of the U.S. Provisional Patent Application having Ser. No. 61/911,954 and filed on Dec. 4, 2013. The subject matter of this related application is hereby incorporated herein by reference.

BACKGROUND OF THE INVENTION

1. Field of the Invention

Embodiments of the present invention relate generally to computer science and, more specifically, to more effective approaches and techniques for interacting with handheld devices, including all aspects of the related hardware, software, and algorithms associated with implementing that function.

2. Description of the Related Art

Interactive computing technology is becoming increasingly ubiquitous. Advances in processing, sensing, and touch-screen interfaces and displays have enabled "smart" devices that fit into pockets, are wrist-worn or head-mounted, or are embedded into clothing. "Smart" devices include cellular phones, tablet computers, "phablet" devices, "smart" watches and glasses, among others. Soon, people may routinely carry around more than one "smart" device during the course of a typical day.

This phenomenon introduces the opportunity to create interactions among multiple "smart" devices. Current techniques focus on using a secondary mobile device, like a "smart" watch, as a viewport and/or a remote control of a "smart" phone. However, such implementations provide only limited functionality. For example, existing approaches fail to address bilaterally dependent or joint interactions on two "smart" devices.

As the foregoing illustrates, what is needed in the art are techniques that support bilaterally dependent or joint interactions among multiple "smart" devices.

SUMMARY OF THE INVENTION

One embodiment of the present invention sets for a method for multiple device interaction that includes detecting an orientation of a first device relative to a second device. The method also includes detecting a first gesture performed with either the first device or the second device, wherein the first gesture causes a first action that is based at least in part on the orientation of the first device relative to the second device.

At least one advantage of the disclosed approach is that it enables a "smart" watch to enhance a wide range of phone-based interactive tasks. An interface can be divided between the phone and the watch. Novel gestures can be used for one or both devices. Another advantage is that sensors implemented in a "smart" watch can be used to augment the understanding of touch gestures made via the "smart" phone, such as using the orientation of the "smart" watch to infer which part of the finger (pad, side, or knuckle) is touching the touch-screen display of the phone.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
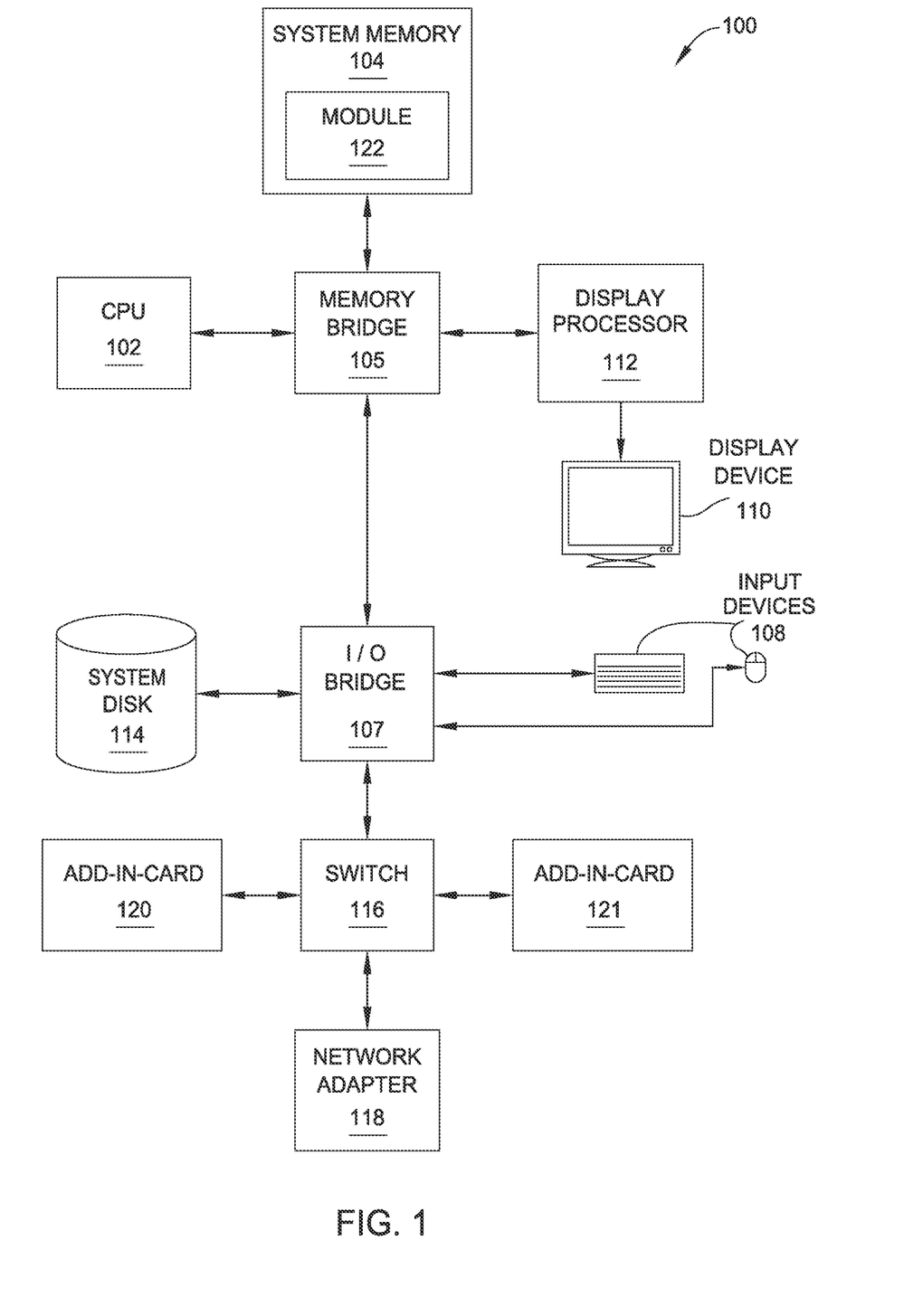
FIG. 1 is a block diagram of a system configured to implement one or more aspects of the invention.

FIG. 1 depicts one architecture of a system 100 within which embodiments of the present invention may be implemented. This figure in no way limits or is intended to limit the scope of the present invention.

System 100 may be a personal computer, video game console, personal digital assistant, mobile phone, mobile device or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

System memory 104 can contain or comprise an engine or module 122 configured to implement the functions and operations of the Duet system. In one embodiment, the module can be software comprised of program instructions executed by a CPU or by a special purpose processor, such as a graphics processing unit (GPU). In other embodiments, the module can be implanted as a hardware element, comprised of circuitry and logic configured to implement the flow, or can be any combination of hardware and/or software.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVDROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Joint Interactions on a "Smart" Phone and a "Smart" Watch

The following describes a technique, referred to herein as "Duet," that enables joint interactions between a "smart" phone and a "smart" watch. Based on their spatial configurations, Duet coordinates the two devices' motion and touch inputs, and extends their visual and tactile output to one another, enabling the watch to enhance a wide range of phone-based interactive tasks. An interface can be divided between the phone and the watch. Novel gestures can be used for one or both devices. Additionally, the sensors of the watch can augment touch on the phone, such as using the orientation of the watch to infer which part of the finger (pad, side, or knuckle) is touching the screen of the phone. These interactions as well as other interactions are described in greater detail below.

Touch is perhaps the most common interaction for modern handheld devices, specifically touch detected with a touch-screen display. Motion and spatial awareness can also be leveraged to enhance touch-based interactions on a touch-screen. Wrist-worn devices have a smaller form factor than phones and are worn on the body, which requires a reconsideration of the techniques used for interaction. Touch, for example, is more difficult on wrist-worn devices which typically have smaller touchscreens. Given the limitations of direct touch, alternate techniques become more important.

Motion and spatial awareness creates a variety of wrist-based interactions. A wrist-worn device provides opportunities to untether the hands of the user from holding a sensing device. In addition, the sensing is always available with the day-to-day activities of the user, and also provides high-fidelity data by closely coupling the device to hand, wrist, and arm movements.

Device-to-device interaction associates multiple individual devices to create new interaction possibilities. Three of these association principles are synchrony, proxemic instructions, and distributed gestures.

Synchrony associates devices by the synchronization of their inputs. For example, two "smart" devices may be bumped into one another to share a photo from one device to the other. Stitching applies a similar idea where a pen stroke across two tablets can be used to transfer files or perform another function. A pinching gesture between mobile devices can span a shared canvas across them.

Proxemic interaction associates devices by their spatial relationship between one another, such as proximity and orientation. As an example, a spatial proximity region around mobile devices can be used to mediate content access and sharing among a group of users.

Distributed interaction divides the tasks, features, or functions of an interface between multiple devices. One example is selecting from a list of tools on a mobile device and applying that tool to an application on a large interactive surface.

Figure 2:
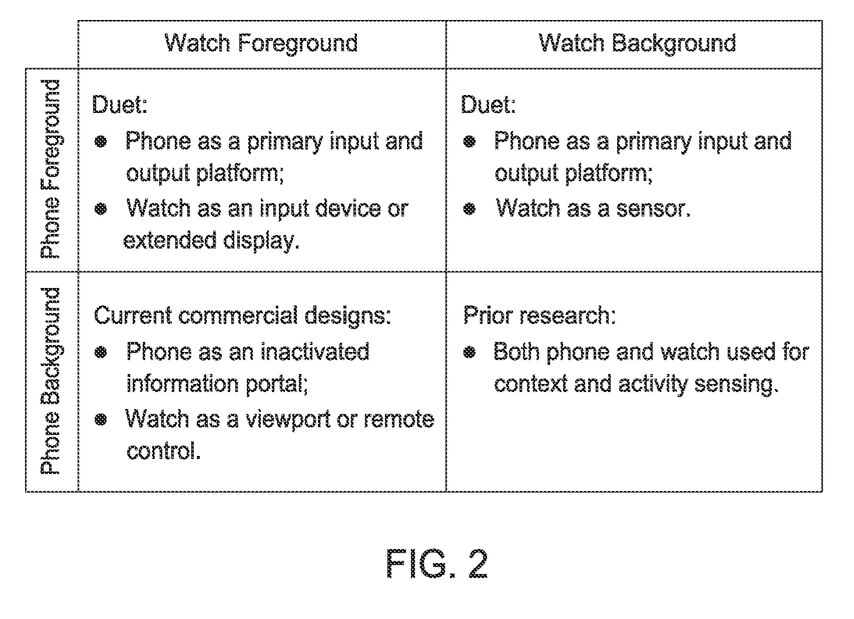
FIG. 2 illustrates a 2×2 design space encompassing a variety of interactions, according to various embodiments of the present invention.

One of the purposes of Duet is to allow a "smart" phone and a "smart" watch to perform their individual input and output techniques and also create new interaction possibilities together. A design space of interaction, as illustrated in FIG. 2, is based on a "foreground-background" framework. One goal of Duet is for the two devices to carry out interactive tasks for the user as a single unified platform. To attain this goal, the two devices perform their individual foreground and background interactions.

FIG. 2 illustrates a 2×2 design space encompassing a variety of interactions, according to various embodiments of the present invention. As shown in FIG. 2, the combination of foreground and background interactions, when two devices are present, creates a 2×2 design space encompassing a variety of interactions that leverage the availability of both devices. Current approaches focus on the lower left quadrant, where the watch is used as a temporal replacement for the phone, such as using the watch to check new emails or read text messages when the phone is not accessible. The lower-right quadrant characterizes work that uses both devices for context and activity sensing. The two upper quadrants relate to implementations where the phone remains in the foreground as an active input and output platform, and the watch transitions between foreground interaction (as an input device and extended display) and background sensing. Duet is embodies a new approach that focuses particularly on these two areas of the design space.

Figure 3:
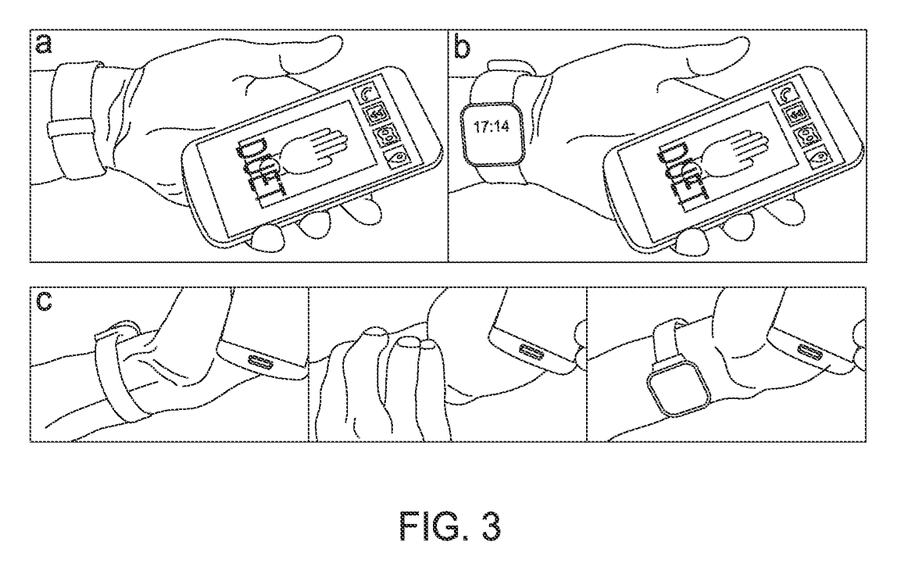
FIG. 3 illustrates two spatial configurations of a "smart" watch, according to different embodiments of the present invention.

FIG. 3 illustrates two spatial configurations of a "smart" watch, according to different embodiments of the present invention. Duet implements methods in which the devices can be worn or carried in relation to one another. FIG. 3 shows two spatial configurations: with the face of the watch worn on the dorsal side (a), or on the ventral side of the wrist (b). These two spatial configurations afford different ways in which the watch can augment phone-based interactions. In particular, wearing the watch on the ventral side provides additional visibility and quicker access to the watch while holding and using the phone. The current spatial configuration can be detected by constantly monitoring the two devices' relative orientation, or by using a motion-based gesture to explicitly register that information. While not necessary, the use of an expansion watchband can enable easy switching between these two configurations (c).

Figure 4:
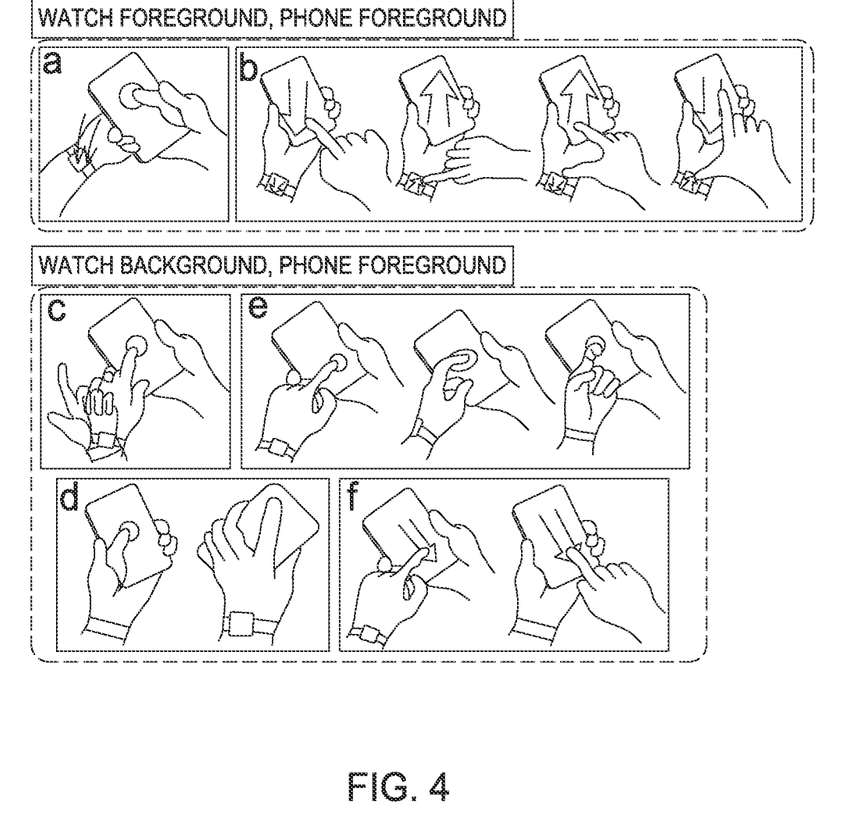
FIG. 4 illustrates a suite of gesture and sensing techniques that may be implemented in accordance with various embodiments of the present invention.

FIG. 4 illustrates a suite of gesture and sensing techniques that may be implemented in accordance with various embodiments of the present invention. The availability of a "smart" phone and a "smart" watch gives rise to a suite of new gestures and sensing techniques, as illustrated in FIG. 4. Specifically, two example categories of techniques are described, where the watch is either in the foreground or background of interaction.

Watch in the Foreground, Phone in the Foreground

In the foreground of interaction, the watch can be used as an additional input device to complement the motion of the phone and touch input. Two example gestures utilize this additional input channel.

The first gesture is double bump. Bumping or tapping the phone on the watch creates a synchronous gesture that provides distinct input properties compared to bumping or tapping on other surfaces. To reduce the chance of false positives, a double bump gesture can be implemented, where the phone bumps against the watch twice in succession, as shown in gesture (a) in FIG. 4.

Next are multi-device gestures. The stitching technique and the pinching gestures can be adopted for interaction between the phone and the watch, to support four novel multi-device gestures, as shown in gesture (b) in FIG. 4. The first two involve the finger swiping from the phone to the watch (phone-to-watch swipe) or from the watch to the phone (watch-to-phone swipe). The second two gestures are performed by two fingers swiping simultaneously, where the fingers move towards each other (pinch-close) or away from each other (pinch-open).

Watch in the Background, Phone in the Foreground

In the background of interaction, the watch can be used as an auxiliary sensor for the phone. A first technique is flip and tap. To perform this gesture, a user flips her hand (that wears the watch) immediately before tapping on the screen of the phone, as shown in gesture (c) in FIG. 4. A second technique is hold and flip, shown in gesture (d) in FIG. 4. This gesture consists of flipping the phone while holding the finger down on the screen. By detecting the synchronized motion of both devices, Duet can distinguish if the user is flipping the phone with the hand wearing the watch.

A third technique is finger posture recognition. By sensing the orientation of the watch when touching the phone, Duet can tell which finger part (pad, side, or knuckle) causes that touch, as seen in gesture (e) in FIG. 4. The fourth technique is handedness recognition, as shown in gesture (f) in FIG. 4. By correlating the motion of the watch with the motion of the phone at the onset of a touch event, Duet can infer whether a touch is caused by a bare hand, or a hand that wears a watch.

The recognition accuracy of the six techniques described above has been tested in various studies. Details of one study can be found in U.S. Provisional Patent Application 61/911, 954, incorporated herein by reference. The accuracy of gestures and sensing techniques, as determined in the study, are shown in FIGS. 5 and 6.

Figure 5:
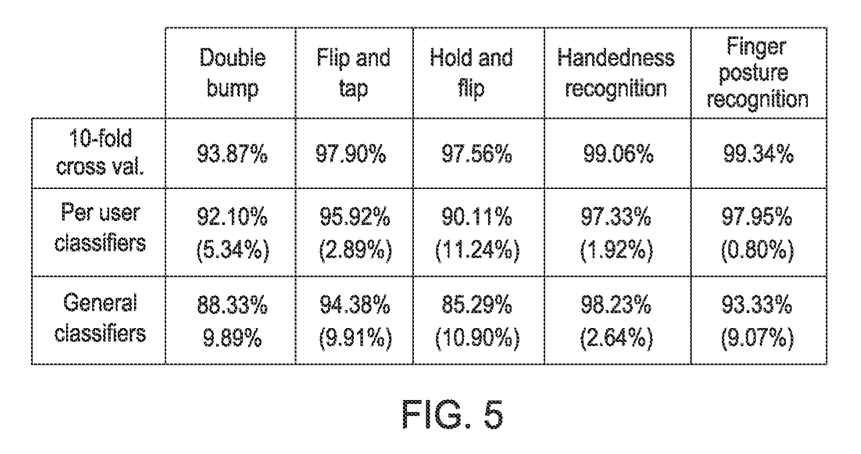
FIG. 5 illustrates the accuracy of gestures and sensing techniques implemented according to at least one embodiment of the present invention.

FIG. 5 illustrates the accuracy of gestures and sensing techniques implemented according to at least one embodiment of the present invention. As shown in FIG. 5, all techniques received an accuracy of over 97% except for double bump (93.87%). The per-user classifiers show that double bump and hold and flip have higher standard deviations. These two techniques are more complicated than the others and may require clearer instructions to users. The general classifiers row in FIG. 5 indicates that for most techniques, there was some inconsistency between participants (standard deviation between 9.00% and 11.00% except for handedness recognition).

Figure 6:
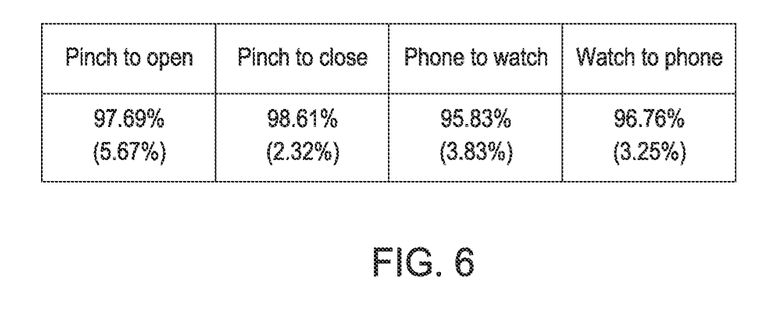
FIG. 6 illustrates the accuracy of multi-device gesture techniques implemented in accordance with at least one embodiment of the present invention.

FIG. 6 illustrates the accuracy of multi-device gesture techniques implemented in accordance with at least one embodiment of the present invention. The multi-device gestures were recognized in the study using hard coded heuristics, based on the gesture length, duration, and timing. The results of the evaluation (see FIG. 6) show a fairly high accuracy of the implementation.

Duet demonstrates how the novel gestures and sensing techniques described above could be utilized to enhance a wide range of interactive tasks across various applications. Duet implements joint interactions between a "smart" phone and "smart" watch. In one example embodiment, the system can be thought of a "smart" phone shell that is enhanced by the watch. The shell consists of a home screen and four common mobile apps in this example. In particular, this example demonstrates how the watch can perform foreground interactions as an input device or extended display, or serve in the background as an auxiliary sensor. Meanwhile, the phone remains in the foreground, whose interaction is enhanced by these three different roles of the watch (auxiliary sensor, extended display, and/or input device).

A home screen may provide techniques for managing the "smart" phone device and its applications. To unlock the device from an inactive mode, a user performs the hold-and-flip gesture. The hold-and-flip gesture requires a synchronized motion of both the phone and the watch, thus reducing recognizer false positives. Optionally, one can use it as an additional security layer that requires the ownership of both devices in order to gain access.

Application selection and arrangement can be accomplished on the home screen. Four application icons are displayed on the home screen. These four example applications are discussed in further detail below (an email application, a map application, a reader application, and a call application). The user can touch an icon to open an application, or use a knuckle-touch to move the icons. Contrary to existing designs, the touch/knuckle-touch approach requires no extra steps to distinguish between opening and navigating the applications, and repositioning their icons.

A person can also use the "smart" watch to quickly switch between applications. Pressing and holding the watch can bring up an application selection screen on the watch, which displays the application icons in a 2×2 grid in this example. Additional application icons would be organized on pages that a user would swipe between. Tapping on an application loads it on the phone, and pressing and holding on the application selection screen dismisses it.

The first example application is an email application. The email application provides techniques to support reading and organizing a list of emails. Tapping an email opens it; while a knuckle-touch can be used to select and apply actions to multiple emails, such as "archive", "mark as read", or "delete". An advantage to the touch/knuckle-touch technique is that it requires no extra widgets (e.g., checkboxes) for selection, thus saving more screen space for the other interactions.

Notification management can also be implemented with Duet. In social occasions like meetings and movies, a person can use the multi-device gestures to manage which device(s) email notifications are received on. A pinch-to-close utilizing both the "smart" watch and the "smart" phone mutes both devices simultaneously, as shown in gesture (b) in FIG. 4. A pinch-to-open using both devices resumes their notifications. A stitching gesture from the phone to the watch directs all the notifications to the watch. The opposite direction pushes all the notifications to be shown on the phone. Tactile feedback can be used to inform the direction of a gesture, e.g., when swiping from the phone to the watch, a user can feel two vibrations—first on the phone, then on the watch, as if a single vibration was "transferred" across the devices. This multi-device technique provides a way to customize notifications on multiple devices without resorting to extra physical buttons or user interface (UI) elements.

A second example application is a map application. The map application enhances the search and navigation tasks of a user. Some existing map applications only partially support one-handed use—a common scenario that happens when, for instance, the user is holding a coffee or something else in one hand. While zooming in can sometimes be accomplished with a double tap, it is difficult to zoom out with a single hand. With Duet, the double bump can be used as a gestural shortcut for zooming out (see FIG. 4a).

Another difficult task on a map application is selecting tiny and cluttered location markers. Duet includes a mechanism for using the watch to facilitate small target acquisition on the phone. To start, the user thumbs down an area of interest, which is then zoomed in on the watch. The user can select an enlarged target on the watch, or swipe to pan and adjust the zoomed-in area. Releasing the thumb brings the user back to the map navigation on the phone. The watch assists users in selecting multiple small targets without invoking widgets that take up screen space.

The watch can also provide shortcuts for interactions on the phone. Swiping on the screen of the watch may be used as a shortcut to switch between normal and satellite views. In general, such simple interactions with the watch can replace tedious menu selections typically carried out on the phone.

A third example application is a reader application. The reader application allows users to read and annotate text. A normal tap on the page brings up the menu with basic and frequently used options. Alternatively, with the watch as a sensor, one can use the flip and tap gesture to display an advanced menu that contains additional commands, as shown in gesture (c) in FIG. 4.

The finger postures recognition can be used to implicitly select tools in the reader application. For example, after selecting a pen tool from the menu, the finger pad is used to annotate the text, the side of the finger is used to scroll the page, and the knuckle is used to start text selection (as shown in gesture (e) in FIG. 4). The finger posture recognition allows for a seamless transition between three frequent operations without having to explicitly specify any modes.

In addition to the copy and paste functions of the phone, the watch can also be used as a clipboard that holds multiple pieces of text. Upon selecting the text, the text can be displayed on the watch. Users can then add it to the clipboard by swiping right on the watch. One can also retrieve an earlier selection by swiping down the clipboard.

By positioning the watch to the ventral side of the wrist, the watch can be used as a tool palette. Swiping on the watch shows more menu options. Hosting the tool palette on the watch saves screen space on the phone for other interactions. It also resembles how a painter holds and uses a color palette while drawing on a canvas.

The fourth example application is the call application. In one example application, the watch can be used to retrieve information while the user is holding the phone for a call. Back-of-device touch on the phone could be used for input. Back-of-device touch utilizes a touch-sensitive surface on the back of the phone. The entire back of the phone could be touch-sensitive, or only a portion of the back of the phone could be touch-sensitive. While a user is holding the phone to their ear, the user can use their fingers that are holding the phone to make a selection on the back of the device touch area. For example, the user could navigate between a list of frequently used applications by swiping up and down, as the list is displayed on the watch. Once the desired application is located, details can be retrieved. If the user selects the email application, swiping left or right on the email application could traverse the inbox, where the watch shows one email at a time. Tapping on the watch could open the email. The user could read the email on the watch by scrolling through the email text. Another tap could close the email. The back-of-device touch technique is useful for cases where the caller needs to quickly access information on the phone, such as emails, missed calls, or calendar events.

Duet utilizes a watch and a phone, and allows for interactions using the watch that may be cumbersome on the phone alone. Some interactions reduce the steps taken compared to the conventional methods. Using the watch as an extended display saves screen real estate for other functions, and can reduce the number of widgets or menus that need to be displayed on the phone screen as these can instead be displayed on the watch. Some features, such as accessing applications on the watch while on a phone call, are difficult to implement when using only a phone.

Figure 7:
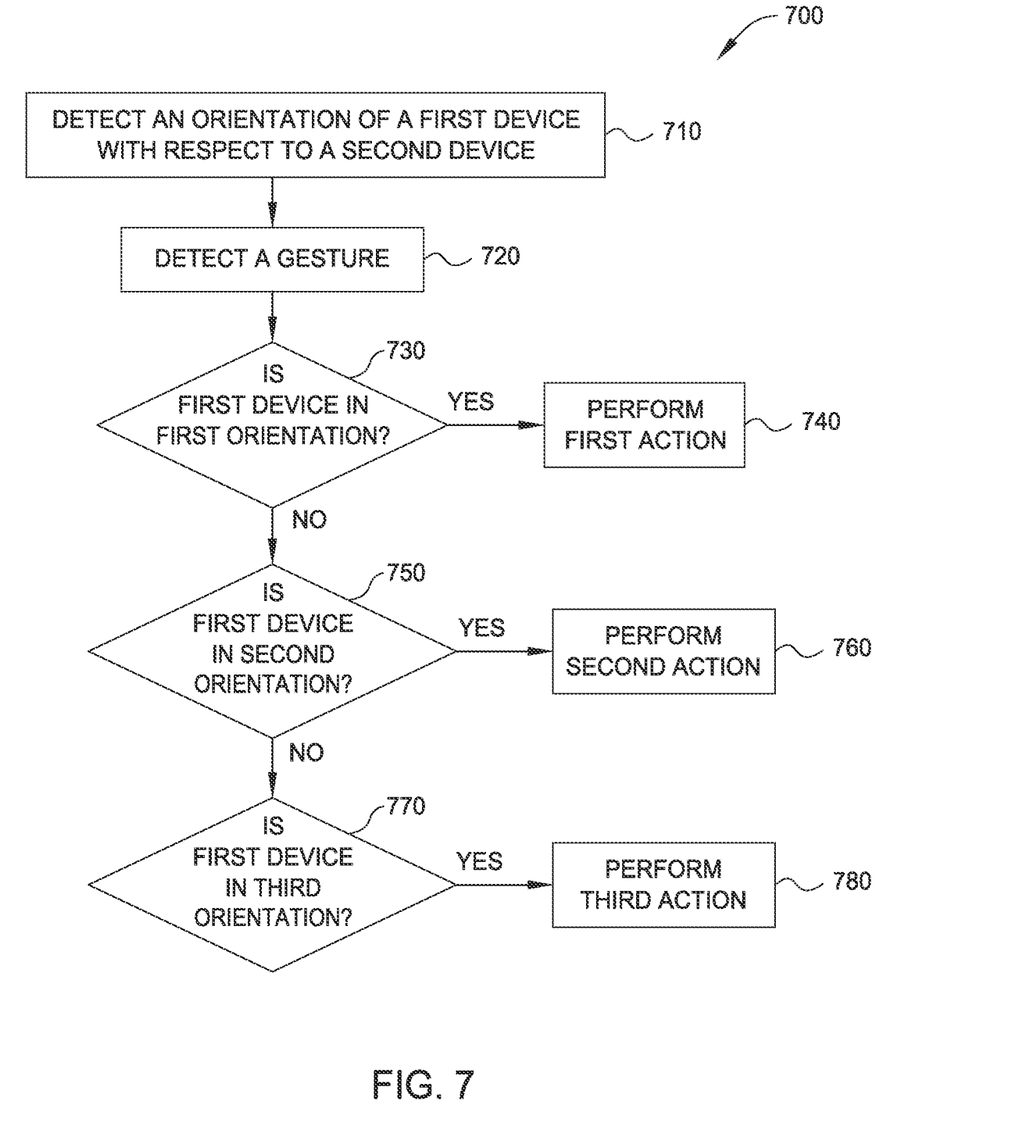
FIG. 7 is a flow diagram of method steps for performing multiple device interaction, according to one example embodiment.

FIG. 7 is a flow diagram of method steps for performing multiple device interaction, according to one example embodiment. Although the method steps are described in conjunction with the systems of FIGS. 1-6, persons skilled in the art will understand that any system configured to perform the method steps, in any order, falls within the scope of the present invention. In various embodiments, the hardware and/or software elements described above in FIGS. 1-6 can be configured to perform the method steps of FIG. 7. In some embodiments, the module 122 illustrated in FIG. 1 can perform some or all of the steps in FIG. 7.

As shown, a method 700 begins at step 710 where an orientation of a first device with respect to a second device is detected. The orientation can be detected by either the first device or the second device. In one example embodiment, the first device is a "smart" watch worn on the wrist of the user and the second device is a "smart" phone. The "smart" phone may detect the orientation of the "smart" watch in relation to the "smart" phone using any suitable technique. For example, proximity sensors and accelerometers may be utilized by the "smart" watch, the "smart" phone, or both.

In step 720, a gesture is detected. Gestures may include repositioning the "smart" watch or the "smart" phone in relation to one another, touching the "smart" watch with a finger, touching the "smart" phone with a finger, bumping the "smart" phone on the "smart" watch, swiping one or more fingers between the phone and the watch, or flipping the "smart" phone or the "smart" watch. Any other suitable gestures may be detected in other embodiments. Either device (or both devices working together) may detect the gesture. In one example, the gesture is touching the screen of the "smart" phone with a finger of the hand/wrist that is wearing the "smart" watch.

In step 730, the method determines whether the first device is in the first orientation. In one example, the "smart" phone determines whether the "smart" watch is in the first orientation. The orientation of the "smart" watch, while the first gesture is performed, determines whether the pad, the side, or the knuckle of the finger is touching the touch screen of the "smart" phone (see FIG. 4e). If the "smart" watch is in the first orientation, the "smart" phone determines that the pad of the finger is touching the touch screen of the phone. In that case, the method proceeds to step 740, and a first action is performed. For example, if the user were using the reader application, the pad of the finger could be used to annotate the text (i.e., the first action). The side or the knuckle of the finger would be used to perform actions different than the first action, as discussed below.

If the first device is not in the first orientation, the method 700 proceeds to step 750, where the "smart" phone determines whether the "smart" watch is in the second orientation. In one example, if the "smart" watch is in the second orientation, the "smart" phone determines that the side of the finger is touching the touch screen of the phone (see FIG. 4e). In that case, the method proceeds to step 760, and a second action is performed. The second action might be scrolling the page within the reader application in one example. The second action is different than the first action.

If the first device is not in the second orientation, the method 700 proceeds to step 770, where the "smart" phone determines whether the "smart" watch is in the third orientation. In one example, if the "smart" watch is in the third orientation, the "smart" phone determines that the knuckle of the finger is touching the touch screen of the phone (see FIG. 4e). In that case, the method proceeds to step 780, and the third action is performed. The third action might be starting text selection in the reader application. The third action is therefore different than either the first action or the second action. The described method allows three different actions to be performed on the "smart" phone based on the orientation of the "smart" watch without having to explicitly specify any modes of operation or select any options on the phone. The described method can be used for any suitable application and can be used to perform any suitable action or set of actions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A method for multiple device interaction, the method comprising:
   detecting a watch orientation of a first watch device relative to a second smart device;
   detecting a first gesture that comprises a touch event between a finger and the second smart device without physical contact between the first watch device and the second smart device;
   identifying a part of the finger that touches the second smart device during the touch event as a first part of the finger when the watch orientation is a first orientation and a second part of the finger when the watch orientation is a second orientation;
   performing a first action when the watch orientation is the first orientation and the part of the finger that touches the second smart device is identified as the first part of the finger; and
   performing a second action when the watch orientation is the second orientation and the part of the finger that touches the second smart device is identified as the second part of the finger.

2. The method of claim 1, wherein the second smart device comprises a phone.

3. The method of claim 1, further comprising detecting a second gesture by detecting a tapping of the second smart device on the first watch device.

4. The method of claim 1, further comprising detecting a second gesture by detecting a swipe gesture between the first watch device and the second smart device.

5. The method of claim 4, wherein the swipe gesture further comprises at least two fingers moving toward one another while at least one finger touches a touch screen associated with the first watch device and at least one other finger touches a touch screen associated with the second smart device.

6. The method of claim 4, wherein executing the swipe gesture spans a display across the first watch device and the second smart device.

7. The method of claim 1, further comprising detecting a second gesture by detecting that a second side of the second smart device is up instead of a first side of the second smart device and detecting a tap gesture on the second smart device.

8. The method of claim 7, wherein the second gesture causes a menu on the second smart device to be accessed.

9. The method of claim 1, wherein detecting the first gesture comprises detecting that a second side of the first watch device is up instead of a first side of the first watch device while simultaneously detecting that a touch screen of the second smart device has been touched by the finger.

10. The method of claim 1, wherein detecting the first gesture comprises detecting a touch by the finger on a touch screen of the second smart device.

11. The method of claim 1, further comprising detecting a second watch orientation of the first watch device relative to the second smart device, and performing a third action if the first watch device is in a predetermined third orientation.

12. The method of claim 1, wherein detecting a second gesture performed on the first watch device results in an action on the second smart device.

13. The method of claim 1, wherein the part of the finger that touches the second smart device includes one or more of a pad, a side, or a knuckle.

14. One or more non-transitory computer-readable storage media including instructions that, when executed by one or more processing units, cause the one or more processing units to perform the steps of:
- detecting a watch orientation of a first watch device relative to a second smart device;
- detecting a first gesture that comprises a touch event between a finger and the second smart device without physical contact between the first watch device and the second smart device;
- identifying a part of the finger that touches the second smart device during the touch event as a first part of the finger when the watch orientation is a first orientation and a second part of the finger when the watch orientation is a second orientation;
- performing a first action when the watch orientation is the first orientation and the part of the finger that touches the second smart device is identified as the first part of the finger; and
- performing a second action when the watch orientation is the second orientation and the part of the finger that touches the second smart device is identified as the second part of the finger.

15. The one or more non-transitory computer-readable storage media of claim 14, wherein the second smart device comprises a phone.

16. The one or more non-transitory computer-readable storage media of claim 14, the steps further comprise detecting a second gesture by detecting a swipe gesture between the first watch device and the second smart device.

17. The one or more non-transitory computer-readable storage media of claim 16, wherein the swipe gesture further comprises at least two fingers moving toward one another while at least one finger touches a touch screen associated with the first watch device and at least one other finger touches a touch screen associated with the second smart device.

18. The one or more non-transitory computer-readable storage media of claim 14, the steps further comprise detecting a second gesture by detecting that a second side of the second smart device is up instead of a first side of the second smart device and detecting a tap gesture on the second smart device.

19. The one or more non-transitory computer-readable storage media of claim 14, wherein detecting the first gesture comprises detecting that a second side of the first watch device is up instead of a first side of the first watch device while simultaneously detecting that a touch screen of the second smart device has been touched by the finger.

20. A system configured to input text on a touch display, the system comprising:
- one or more memories that store instructions, and
- one or more processors that are coupled to the one or more memories and, when executing the instructions, perform the steps of:
  - detecting a watch orientation of a first watch device relative to a second smart device;
  - detecting a first gesture that comprises a touch event between a finger and the second smart device without physical contact between the first watch device and the second smart device;
  - identifying a part of the finger that touches the second smart device during the touch event as a first part of the finger when the watch orientation is a first orientation and a second part of the finger when the watch orientation is a second orientation;
  - performing a first action when the watch orientation is the first orientation and the part of the finger that touches the second smart device is identified as the first part of the finger; and
  - performing a second action when the watch orientation is the second orientation and the part of the finger that touches the second smart device is identified as the second part of the finger.

* * * * *